US007266642B2

United States Patent
Shen et al.

(10) Patent No.: US 7,266,642 B2
(45) Date of Patent: Sep. 4, 2007

(54) CACHE RESIDENCE PREDICTION

(75) Inventors: Xiaowei Shen, Hopewell Junction, NY (US); Jaehyuk Huh, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 10/779,999

(22) Filed: Feb. 17, 2004

(65) Prior Publication Data

US 2005/0182907 A1   Aug. 18, 2005

(51) Int. Cl.
*G06F 12/00* (2006.01)
(52) U.S. Cl. .................. 711/118; 711/141; 711/145; 711/144
(58) Field of Classification Search ................ 711/118, 711/141, 145, 144
See application file for complete search history.

(56) References Cited

U.S. PATENT DOCUMENTS

2002/0144063 A1*  10/2002  Peir et al. ................... 711/141

* cited by examiner

*Primary Examiner*—Kimberly McLean-Mayo
(74) *Attorney, Agent, or Firm*—F. Chau & Associates LLC (57) ABSTRACT

The present invention proposes a novel cache residence prediction mechanism that predicts whether requested data of a cache miss can be found in another cache. The memory controller can use the prediction result to determine if it should immediately initiate a memory access, or initiate no memory access until a cache snoop response shows that the requested data cannot be supplied by a cache.

The cache residence prediction mechanism can be implemented at the cache side, the memory side, or both. A cache-side prediction mechanism can predict that data requested by a cache miss can be found in another cache if the cache miss address matches an address tag of a cache line in the requesting cache and the cache line is in an invalid state. A memory-side prediction mechanism can make effective prediction based on observed memory and cache operations that are recorded in a prediction table.

19 Claims, 7 Drawing Sheets

CACHE RESIDENCE PREDICTION

BACKGROUND OF THE INVENTION

1. Field of the Invention

The present invention relates to computer-based memory system, and, more particularly, cache residence prediction and its use in memory access filtering.

2. Description of the Related Art

In modern computer systems, caches are widely used to reduce memory access latencies. A symmetric multiprocessor ("SMP") system generally employs a snoopy mechanism to ensure cache coherence. When a cache miss occurs, the requesting cache may send a cache request to the memory and all the peer caches. The term "peer cache" generally refers to a cache that is on the same snoopy network as the requesting cache. When a peer cache receives the cache request, it snoops its cache directory and produces a cache snoop response indicating whether the requested data is found in the cache and the state of the cache line that contains the requested data. A combined snoop response can be generated based on snoop responses from all the peer caches. If the requested data is found in a peer cache, the peer cache can source the data to the requesting cache via a cache intervention. The memory is responsible for supplying the requested data if the combined snoop response shows that the data cannot be supplied by any peer cache.

There are many protocols and techniques for achieving cache coherence that are known to those skilled in the art. A number of snoopy cache coherence protocols have been proposed. The MESI cache coherence protocol and its variations have been widely used in SMP systems. As the name suggests, MESI has four cache states, modified (M), exclusive (E), shared (S) and invalid (I).

I (invalid): The data is not valid. This is the initial state or the state after a snoop invalidate hit.

S (shared): The data is valid, and can also be valid in other caches. This state is entered when the data is sourced from the memory or another cache in the modified state, and the corresponding snoop response shows that the data is valid in at least one of the other caches.

E (exclusive): The data is valid, and has not been modified. The data is exclusively owned, and cannot be valid in another cache. This state is entered when the data is sourced from the memory or another cache in the modified state, and the corresponding snoop response shows that the data is not valid in another cache.

M (modified): The data is valid and has been modified. The data is exclusively owned, and cannot be valid in another cache. This state is entered when a store operation is performed on the cache line.

With the MESI protocol, when a cache miss occurs, if the requested data is found in another cache and the cache line is in the modified state, the cache with the modified data supplies the data via a cache intervention (and writes the most up-to-date data back to the memory). However, if the requested data is found in another cache and the cache line is in the shared state, the cache with the shared data does not supply the requested data, since it cannot guarantee from the shared state that it is the only cache that is to source the data. In this case, the memory need to source the data to the requesting cache.

The IBM® Power 4 system, for example, enhances the MESI protocol to allow more cache interventions. Compared with MESI, an enhanced coherence protocol allows data of a shared cache line to be sourced via a cache intervention. In addition, if data of a modified cache line is sourced from one cache to another, the modified data does not have to be written back to the memory immediately. Instead a cache with the most up-to-date data can be held responsible for necessary memory update if the data is replaced from the cache eventually. An exemplary enhanced MESI protocol employing seven cache states is as follows.

I (invalid): The data is invalid. This is the initial state or the state after a snoop invalidate hit.

SL (shared, can be sourced): The data is valid, and may also be valid in other caches. The data can be sourced to another cache via a cache intervention. This state is entered when the data is sourced from another cache or from the memory.

S (shared): The data is valid, and may also be valid in other caches. The data cannot be sourced to another cache. This state is entered when a snoop read hit occurs on a cache line in the SL state.

M (modified): The data is valid, and has been modified. The data is exclusively owned, and cannot be valid in another cache. The data can be sourced to another cache. This state is entered when a store operation is performed on the cache line.

Me (exclusive): The data is valid, and has not been modified. The data is exclusively owned, and cannot be valid in another cache.

Mu (unsolicited modified): The data is valid, and is considered to have been modified. The data is exclusively owned, and cannot be valid in another cache.

T (tagged): The data is valid, and has been modified. The modified data has been sourced to another cache. This state is entered when a snoop read hit occurs on a cache line in the M state.

In modern SMP systems, when a cache miss occurs, if the requested data is found in both the memory and another cache, supplying the data via a cache intervention is often preferred because cache-to-cache communication latency is usually smaller than memory access latency. Furthermore, cache-to-cache communication may have more available bandwidth when caches are on the same die or in the same module, while memory bandwidth can be more critical and contested resource.

When the memory controller receives a cache request of a cache miss, it cannot determine whether the requested data need to be retrieved from memory until the corresponding cache snoop operation completes (or partially completes). In modern SMP systems, a snoop operation may take tens or hundreds of cycles, especially when caches are connected with one another via an interconnect such as a ring instead of a bus. Under this situation, there are generally two alternatives for the memory controller to handle the cache request, namely lazy memory access and eager memory access.

With lazy memory access, the memory controller initiates no memory access until it determines from the corresponding snoop response that the requested data cannot be supplied by a peer cache. This can avoid unnecessary memory accesses, but may result in significant latency if it turns out that the requested data need to be retrieved from the memory.

With eager memory access, in contrast, the memory controller initiates the memory access immediately after it receives the cache request, even though the cache snoop response is not available at the time. If it turns out that the requested data can be supplied from another cache, either the cache or the memory can supply the data to the requesting cache (the data retrieved from the memory can be discarded in case of a cache intervention). Compared with lazy memory access, eager memory access can avoid unnecessary memory access latency, but may result in unnecessary memory bandwidth consumption when the requested data can be supplied from another cache. The problem becomes more serious as cache size increases, especially for applications that exhibit high cache-to-cache transfer ratios due to frequently communicated cache lines.

Therefore, it is desirable to have a cache residence prediction mechanism that can predict whether requested data of a cache miss can be supplied from another cache. The memory controller can therefore use the prediction result to determine whether it should initiate the memory access immediately when it receives the cache request. An effective cache residence prediction mechanism allows the memory controller to avoid unnecessary memory access latency and unnecessary bandwidth consumption.

SUMMARY OF THE INVENTION

In one aspect of the present invention, a system of cache residence prediction in a computer system is provided. The system includes a plurality of caches, comprising a first cache and one or more other caches; and a prediction mechanism predicting that data requested by the first cache of a cache miss can be found in at least one of the one or more other caches, if an address of the cache miss matches an address tag of a cache line in the first cache and the cache line in the first cache is in an invalid state.

In a second aspect of the present invention, a system of cache residence prediction in a computer system is provided. The system includes a plurality of caches, comprising a first cache and one or more other caches; a memory and a memory controller operatively coupled to the memory; and a prediction mechanism operatively coupled to the first cache, the prediction mechanism predicting whether data requested by the first cache of a cache miss can be supplied by at least one of the one or more other caches, producing a prediction result, and sending the prediction result to the memory controller; wherein the memory controller uses the prediction result to determine if the memory is to be accessed immediately, or if the memory is not to be accessed until a corresponding cache snoop operation shows that the data requested by the first cache cannot be supplied by at least one of the one or more other caches.

In a third aspect of the present invention, a system of cache residence prediction in a computer system is provided. The system includes a plurality of caches, comprising a first cache and one or more other caches; a memory and a memory controller operatively coupled to the memory; and a prediction mechanism predicting whether data requested by the first cache of a cache miss can be found in at least one of the one or more other caches, and producing a prediction result; wherein the prediction mechanism comprises a prediction table that is updated accordingly when the prediction mechanism observes a cache operation that can affect whether data requested by the first cache of a future cache miss can be found in at least one of the one or more other caches.

In a fourth aspect of the present invention, a system of cache residence prediction in a computer system is provided. The system includes a plurality of caches, comprising a first cache and one or more other caches; a memory and a memory controller operatively coupled to the memory; a first prediction mechanism operatively coupled to the first cache, the first prediction mechanism predicting whether data requested by the first cache of a cache miss can be supplied by at least one of the one or more other caches, producing a first prediction result, and sending the first prediction result to the memory controller; and a second prediction mechanism operatively coupled to the memory, the second prediction mechanism predicting whether requested data by the first cache of a cache miss can be supplied by at least one of the one or more other caches, and producing a second prediction result; wherein an overall prediction result is determined by the first prediction result and the second prediction result; and wherein the memory controller uses the overall prediction result to determine if the memory is to be accessed immediately, or if the memory is not to be accessed until a corresponding cache snoop operation shows that the data requested by the first cache cannot be supplied by at least one of the one of more other caches.

In a fifth aspect of the present invention, a method of cache residence prediction in a computer system is provided. The method includes the steps of receiving a cache miss of a first address by a first cache; predicting that data requested of the cache miss by the first cache can be supplied by one or more other caches, if the first address matches an address tag of a cache line in the first cache and the cache line is in an invalid cache; and producing a prediction result and sending the prediction result to a component that can use the prediction result for some appropriate optimization.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Illustrative embodiments of the invention are described below. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims. It should be understood that the systems and methods described herein may be implemented in various forms of hardware, software, firmware, or a combination thereof.

Figure 1:
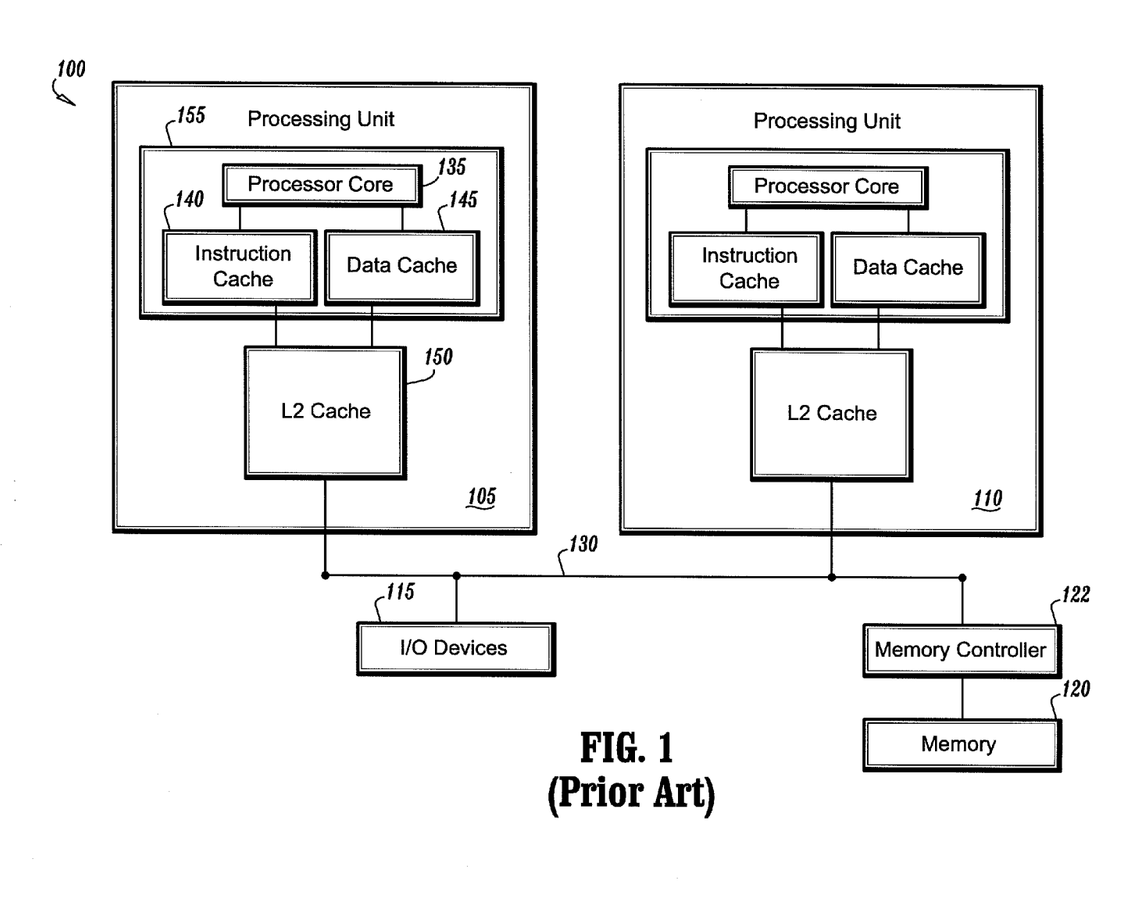
FIG. 1 shows a block diagram of a multiprocessor computer system.

Referring now to FIG. 1, the basic architecture of a conventional multiprocessor computer system 100 is illustrated. The computer system 100 has two processing units 105, 110 that can communicate with each other via an interconnect 130. Each of the processing units 105, 110 has a processor core 135 containing one or more execution units which carry out program instructions. Each of the processing units 105, 110 can access a memory 120 controlled by a memory controller 122. The computer system 100 may include input/output ("I/O") devices 115 that may include, but are not limited to, a display monitor, keyboard, graphical pointer, and a storage device (e.g., hard disk). Although only two processing units are depicted, it is understood that any number of processing units can be included in the system, as contemplated by those skilled in the art.

Each of the processing units 105, 110 can include one or more caches, such as an instruction cache 140 and a data cache 145 that are referred to as level 1 ("L1") caches. Each of the processing units 105, 110 can include additional caches, such as a level 2 ("L2") cache 150 that can act as an intermediary between the L1 caches 140, 145 and the memory 120. Each cache has an associated cache controller (not shown) to perform cache operations including cache snoop operations. Although a two-level cache hierarchy is depicted, it is understood that multiple levels of caches can be included in the system.

Figure 2:
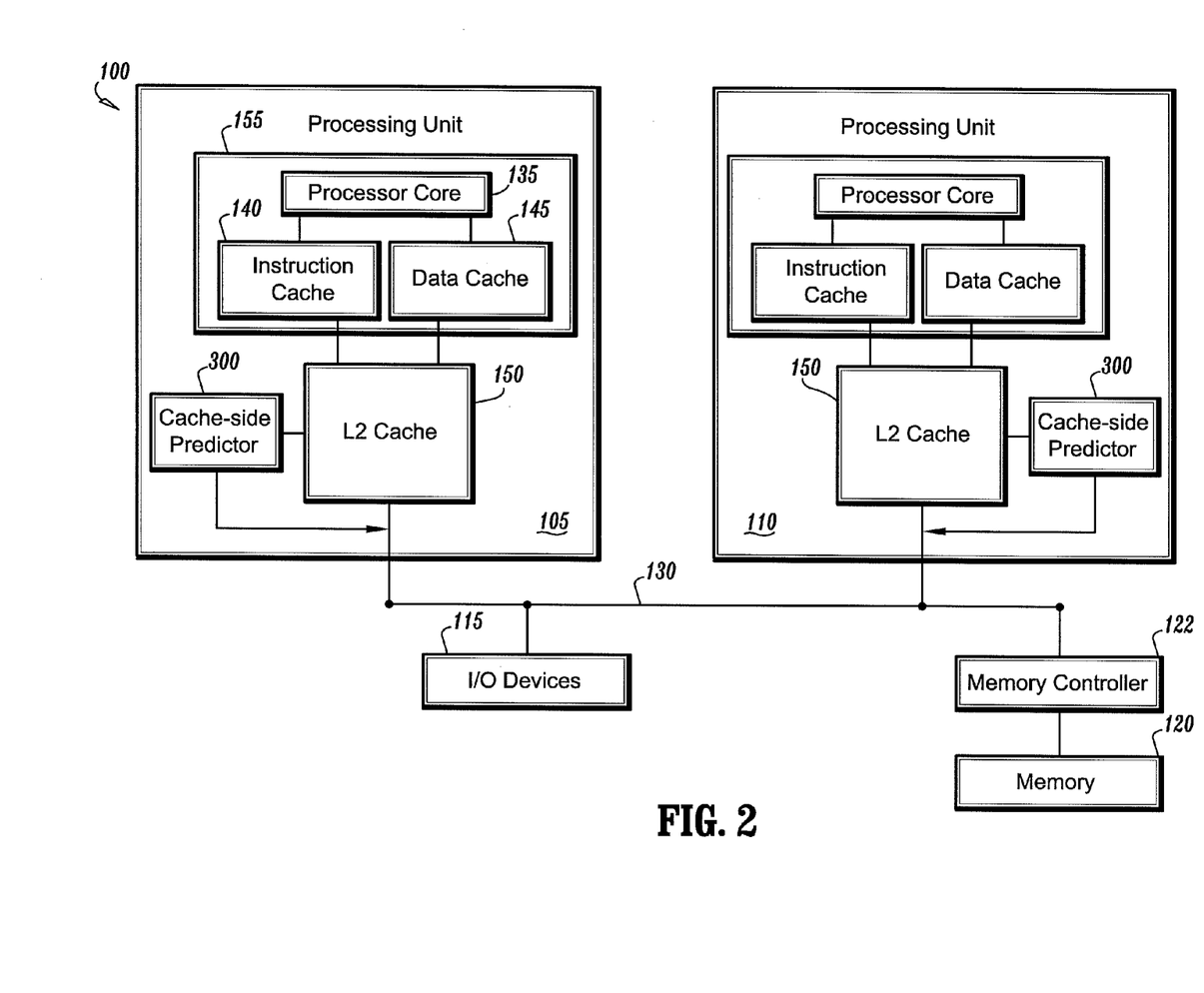
FIG. 2 shows a computer system with a cache-side cache residence prediction mechanism, in accordance with one embodiment of the present invention.

The present invention introduces a novel cache residence prediction mechanism that predicts whether the requested data of a cache miss can be supplied by another cache via a cache-to-cache data transfer. As shown in FIG. 2, a cache-side prediction mechanism 300 can reside at the cache side of the computer system 100. The prediction only uses information available to the corresponding cache controller (e.g., the directory that includes the address and the cache state for each cache line). When a cache miss happens, the cache-side prediction mechanism 300 makes its prediction and associates the prediction result with the cache request. This prediction result can be encoded in the cache request itself or sent to the memory controller 122 as a separate message. It is used to inform the memory controller 122 whether the cache miss can be serviced by another cache. Although the cache-side prediction mechanism 300 is shown to be implemented for an L2 cache 150, it is understood that the present invention is not so limited. A cache-side prediction mechanism may be implemented for any cache in the computer system.

Figure 3:
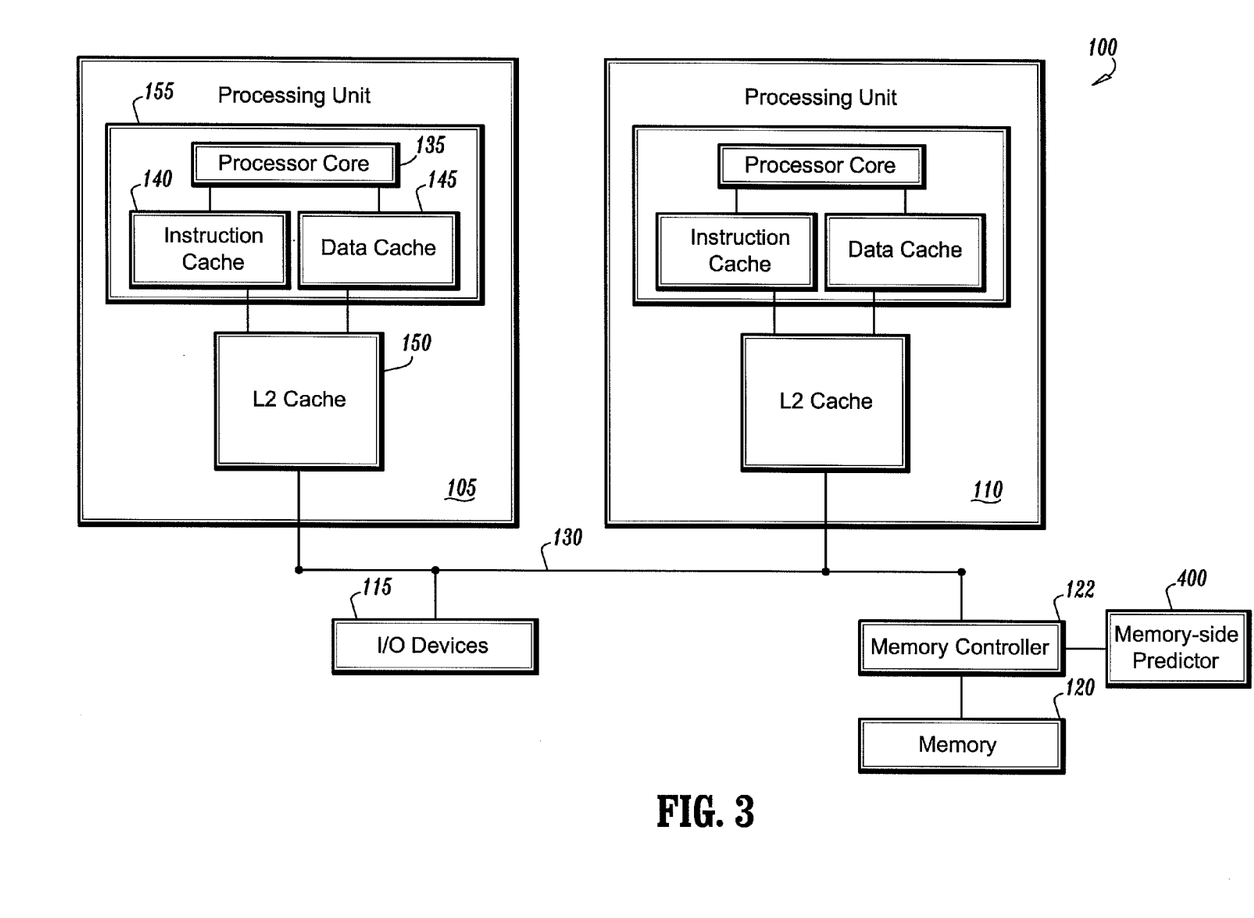
FIG. 3 shows a computer system with a memory-side cache residence prediction mechanism, in accordance with one embodiment of the present invention.

On the other hand, as shown in FIG. 3, a memory-side prediction mechanism 400 can reside at the memory side of the computer system 100. The prediction only uses information available to the memory controller 122, including memory access operations and cache snoop results that can be seen by the memory controller 122. When the memory controller 122 receives a cache request, the memory-side prediction mechanism 400 makes its prediction on whether the cache request can be serviced by another cache. Although the memory-side prediction mechanism 400 is shown to be implemented for the memory, it is understood that the present invention is not so limited. A memory-side prediction mechanism may be implemented for a cache in the computer system that has multiple levels of caches. For example, if the computer system includes an L3 cache (not shown) between the L2 caches and the memory, the L3 cache can behave as the memory from the perspective of an L2 cache. In this case, a memory-side prediction mechanism can be associated with the L3 cache controller. When the L3 cache controller receives a cache request from an L2 cache, the prediction mechanism predicts whether the requested data can be supplied by another L2 cache.

The prediction information, from either the cache-side prediction mechanism 300 or the memory-side prediction mechanism 400, can be used to improve the performance of the memory system when the memory controller 122 receives a cache request. Based on the cache residence prediction result, the memory controller 122 decides if it should initiate the memory access immediately or wait until the corresponding cache snoop response shows that the cache request definitely cannot be serviced by another cache. As a result, the memory controller 122 avoids an unnecessary memory access if the prediction result correctly predicts that the cache request can be serviced by another cache. On the other hand, the memory controller 122 can initiate a necessary memory access without delay if the prediction result correctly predicts that the cache request cannot be serviced by another cache.

A cache residence prediction mechanism can use a prediction table, which can be implemented at the cache side or the memory side. Many applications have a relatively small set of frequently communicated cache lines (also known as hot blocks). Throughout the program execution, a hot block is often transferred from one cache to another as a consequence of a read or write operation. When a processor intends to modify a hot block, it writes the most up-to-date data in its own cache while invalidating the data from all other caches. Later if another processor intends to read the hot block, the requested data can be found in the cache that has the most up-to-date data (if the cache line has not been replaced from the cache). Detecting and recording hot blocks can help predict whether the requested data of a cache miss can be provided by another cache.

A novel feature of the present invention is the cache-side cache residence prediction via invalid cache states. If a cache miss matches an address tag of a cache line and the cache line is in an invalid state, the cache-side prediction mechanism 300 predicts that the requested data can be supplied by another cache. The rationale behind this prediction is that the data of a frequently communicated cache line can often be found in another cache. An invalid cache line with a matched tag indicates that the cache line has been invalidated and has not been refilled with another address. This is a good indication that the data is likely to be found in another cache. It can be the cache that caused the cache line to be invalidated, or a cache that received the data thereafter. This cache residence prediction based on invalid cache states has a very low implementation cost.

Referring now to FIG. 2, in a first embodiment of the present invention, each L2 cache 150 comprises a cache-side prediction mechanism 300 that predicts on a cache miss whether the data can be supplied from another cache. As previously mentioned, if the address of the cache miss is found in the L2 cache 150 (in an invalid cache state), the cache-side prediction mechanism 300 predicts that the cache request can be serviced by another cache. Otherwise, the cache-side prediction mechanism 300 predicts that the cache request cannot be serviced by another cache. The result of the cache-side prediction mechanism 300 may be associated with the cache request that is sent to the memory controller 122.

When the memory controller 122 receives the cache request, it uses the prediction result as heuristic information to determine if it should immediately access the data in the memory 120. If the prediction result indicates that the cache request can be serviced by another cache, the memory controller 122 will not immediately access the memory 120. Instead it will wait for the corresponding cache snoop operation to complete or partially complete. When the snoop cache operation completes or partially completes, if the snoop result shows that the prediction is correct (i.e., the requested data can be supplied by another cache), the memory 120 is not accessed. If the snoop result shows that the prediction is incorrect (i.e., the requested data cannot be supplied by another cache), the memory 120 is accessed in order to retrieve the data.

In contrast, when the memory controller 122 receives a cache request, if the prediction result indicates that the cache request cannot be serviced another cache, the memory controller 122 will immediately access the memory. When the corresponding cache snoop operation completes, if the snoop result shows that the prediction is correct (i.e., the requested data cannot be supplied by another cache), the data retrieved from the memory 120 is sent to the requesting cache. If the snoop result shows that the prediction is incorrect (i.e., the requested data can be supplied by another cache), there are two possible scenarios. If the snoop result shows that the memory 120 does not contain the most up-to-date data, the data from the cache is sent to the requesting cache (while the stale data from the memory 120 can be discarded). If the snoop result shows that both the cache and the memory 120 contain the most up-to-date data, the data from the cache or the memory 120 can be sent to the requesting cache (while the unused data can be discarded).

In a second embodiment of the present invention, each L2 cache 150 has a cache-side prediction mechanism 300 that employs a prediction table. The prediction table contains a number of prediction entries that record addresses of recently replaced invalid cache lines. It can be organized as a cache with an appropriate replacement algorithm, such as Least Recently Used (hereinafter "LRU"). Each table entry may contain an address, a Valid bit (hereinafter "V bit") that indicates if the entry contains a valid address, and possibly some LRU bits used for table entry replacement. A table entry is "valid" if its V bit is set. A table entry is "invalid" if its V bit is not set.

When a cache line is replaced from the cache, if the cache state is invalid, the prediction table records the address. If there is an invalid entry in the corresponding table set, the entry can be used to hold the new address; otherwise a table entry chosen by the replacement algorithm is used to hold the new address (while the old address in the table entry is discarded). A valid entry becomes invalid when a cache miss of the corresponding address is serviced (by either the memory or a cache).

A variation of the cache-side prediction mechanism 300 described above uses the prediction table to record the addresses for not only replaced invalid cache lines, but also replaced shared cache lines. When a shared cache line is replaced, if its cache state indicates that the data can be found in one or more other caches and can be supplied by one of them, the address of the shared cache line is recorded in the prediction table. This allows the cache-side prediction mechanism 300 to predict that a future cache miss on the address can be serviced by another cache. The chart below illustrates the above operations.

| The operation | When to perform the operation? |
| --- | --- |
| Record an address to the prediction table | An invalid (or shared) cache line is replaced from the cache |
| Remove an address from the prediction table | (1) A prediction table entry is released so that it can be used for another address; or (2) a cache miss on the address is serviced by the memory or a peer cache |

Figure 4:
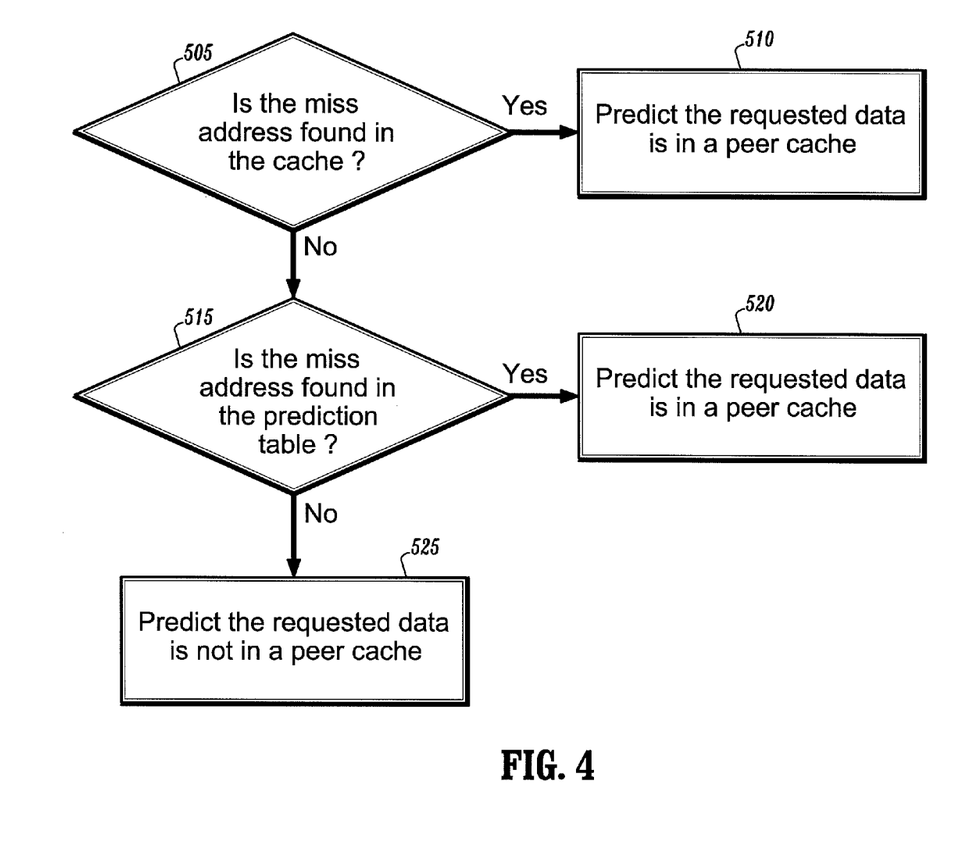
FIG. 4 shows a flow diagram of a cache residence prediction algorithm performed by a cache-side cache prediction mechanism that comprises a prediction table.

Referring now to FIG. 4, the cache-side prediction mechanism 300 works as follows. When a cache miss occurs, if the address of the cache miss is found (at 505) in the cache directory (with an invalid cache state), the cache-side prediction mechanism 300 predicts (at 510) that the requested data can be supplied from another cache. Otherwise, if the address of the cache miss is found (at 515) in the prediction table (with its V bit set to valid), the cache-side prediction mechanism 300 predicts (at 520) that the requested data can be supplied from another cache. Otherwise, the cache-side prediction mechanism 300 predicts (at 525) that the requested data should be supplied from the memory 120. The prediction result is sent to the memory controller 122 along with the cache request.

It should be noted that when a cache line is invalidated, the address may not be recorded in the prediction table until the invalidated cache line is to be filled with another address. This can improve the utilization of the prediction table.

Figure 5:
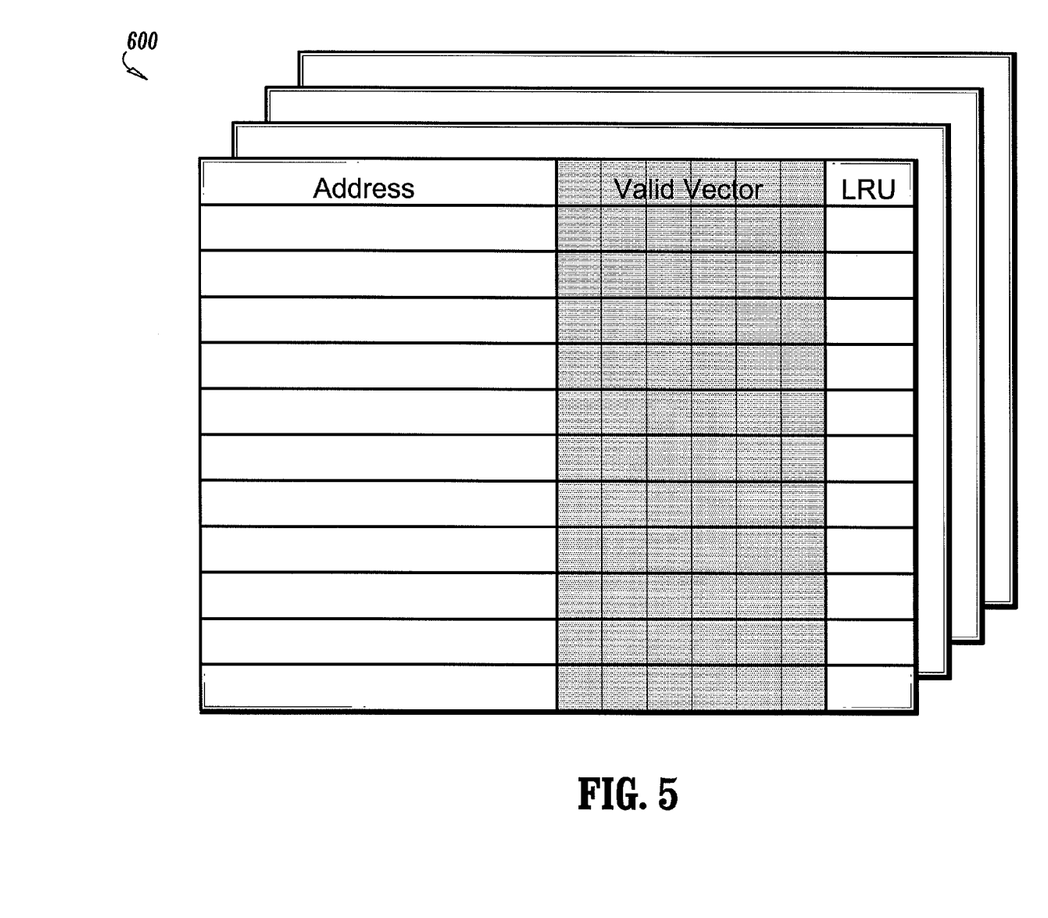
FIG. 5 shows the structure of a prediction table that records addresses for super-blocks instead of cache lines.

In a third embodiment of the present invention, the prediction table of the second embodiment records addresses for super-blocks instead of cache lines in order to reduce implementation overhead resulting from a potentially large prediction table. A super-block comprises multiple cache lines that are continuous in the address space. Referring now to FIG. 5, a super-block prediction table entry 600 comprises a super-block address, a Valid vector (hereinafter "V vector") that has one bit for each cache line in the super-block, and some LRU bits. For example, assuming the cache line size is 128B and the super-block size is 4 KB, a V vector comprises 32 V bits since a super-block contains 32 cache lines.

When an invalid (or shared) cache line is replaced, a cache-side prediction mechanism 300 checks the super-block prediction table. If the corresponding super-block address is found, the cache-side prediction mechanism 300 sets the corresponding V bit to valid. If the super-block address is not found, the cache-side prediction mechanism 300 records the address in the table and sets the corresponding V bit to valid.

When a cache miss happens, if the address matches one of the addresses in the cache directory (with an invalid cache state), the cache-side prediction mechanism 300 predicts that the cache miss can be serviced by another cache; otherwise the prediction table is consulted. If the address is found in the prediction table and the corresponding V bit is valid, the cache-side prediction mechanism 300 predicts that the cache miss can be serviced by another cache.

When a cache miss is serviced, if the address of the cache miss is in the prediction table, the corresponding V bit is set to invalid. A table entry is invalid if all its V bits are set to invalid. The table replacement algorithm may prefer to replace an invalid entry when a replacement is necessary.

In a fourth embodiment of the present invention, each L2 cache 150 has a cache-side prediction mechanism 300 using a prediction table, wherein each table entry represents to a number of cache lines determined by a predefined hash function. The hash function maps a cache line address to one or more table entries of the prediction table. For example, a simple hash function maps an address to a table entry by using certain address bits as the index. Each table entry maintains an address, a counter, and some LRU bits. The address may not be a complete address (e.g., it can be an address range that contains a set of cache lines that are all mapped to the same table entry).

When an invalid (or shared) cache line is replaced, if the address is not recorded in the prediction table, the cache-side prediction mechanism 300 records the address with the corresponding counter set to 0. For each address in the prediction table, when the requested data of a cache miss on that address is supplied by another cache, the corresponding counter is incremented accordingly; when the requested data of a cache miss on that address is supplied by the memory, the corresponding counter is decremented accordingly. A counter saturates when it reaches its maximum or minimum (i.e., 0). It should be noted that when a counter increments, it may chose to increment by 1 or any number, or increment to the maximum. On the other hand, when a counter decrements, it may chose to decrement by 1 or any number, or decrement to the minimum. Different counter update policies may reflect different cost metrics due to mispredictions in various situations. The chart below illustrates the above operations.

| The Operation | When to perform the operation |
| --- | --- |
| Record an address in the prediction table | An invalid (or shared) cache line is replaced from the cache, and the address is not recorded in the prediction table yet |
| Remove an address from the prediction table | A prediction table entry is released so that it can be used for another address |
| Increment a prediction counter | A cache miss on the address is serviced by a peer cache |
| Decrement a prediction counter | A cache miss on the address is serviced by the memory |

Figure 6:
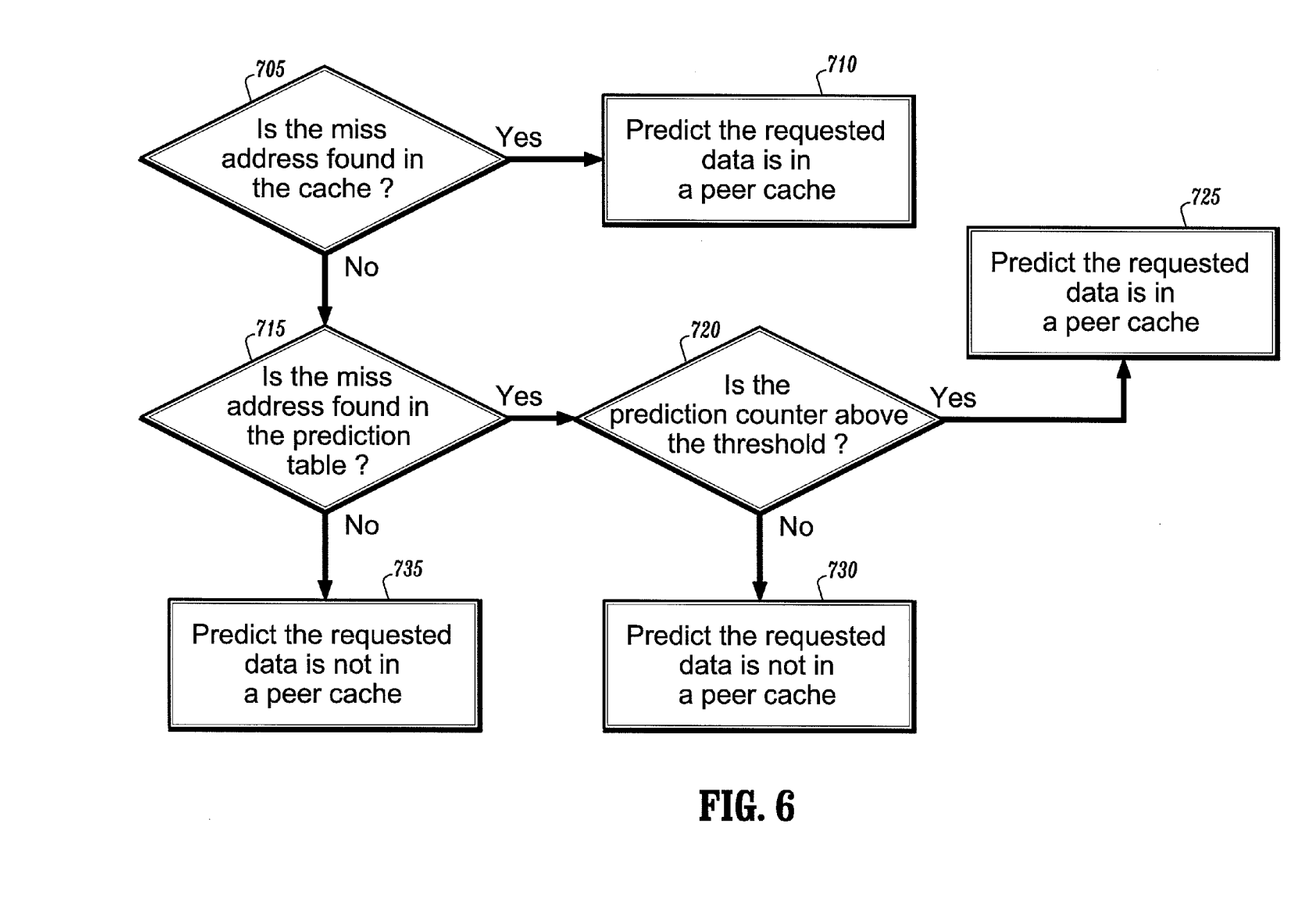
FIG. 6 shows a flow diagram of a cache residence prediction algorithm performed by a cache-side prediction mechanism that comprises a prediction table, wherein each table entry corresponds to a number of cache lines and contains a counter.

Referring now to FIG. 6, the cache-side prediction mechanism works as follows. When a cache miss occurs, if the address of the cache miss is found (at 705) in the cache directory (with an invalid cache state), the prediction mechanism 300 predicts (at 710) that the requested data can be supplied by another cache. Otherwise, if the address is found (at 715) in the prediction table and the corresponding counter is above some threshold (at 720), the cache-side prediction mechanism 300 predicts (at 725) that the requested data can be supplied by another cache. Otherwise it predicts (at 730 or 735) the requested data is in the memory.

In a fifth embodiment of the present invention, a memory-side prediction mechanism 400 is implemented at the memory side, as illustrated in FIG. 3. The memory-side prediction mechanism 400 employs a prediction table that records addresses of hot blocks that are observed by the memory controller 122. The prediction table can be organized as a cache. Each table entry in the prediction table contains an address, a Valid bit and some LRU bits.

When the memory controller 122 observes a memory access or cache snoop operation indicating that a future cache miss on a particular address can be serviced by a cache-to-cache transfer, the memory-side prediction mechanism 400 records the address in its prediction table. For example, if the memory controller 122 observes that a cache obtains the exclusive ownership of a cache line by invalidating an address from all other caches, the memory-side prediction mechanism 400 may conclude that the invalidated address will be cached exclusively in the cache that can supply the data to another cache via a cache-to-cache transfer. In another example, if the memory controller 122 observes that a cache miss request is serviced by another cache, the memory-side prediction mechanism 400 may conclude that the address of the cache miss will be cached in one or more caches, wherein one of them may supply the data to another cache via a cache-to-cache data transfer.

On the other hand, when the memory controller 122 observes a memory access or cache snoop operation indicating that a future cache miss on a particular address cannot be serviced by a cache, the memory-side prediction mechanism 400 removes the address from its prediction table. For example, when the memory controller 122 observes that a cache replaces a modified cache line (with the data written back to the memory), the memory-side prediction mechanism 400 may conclude that the address of the replaced cache line will not be cached in any cache. The chart below illustrates the above operations.

| The Operation | When to perform the operation |
| --- | --- |
| Record an address in the prediction table | The memory observes an operation (e.g. an invalidate or a cache-to-cache data transfer) that indicates a future cache miss on the address will be serviced by a cache, and the address is not recorded in the prediction table yet |
| Remove an address from the prediction table | (1) A prediction table entry is released so that it can be used for another address; or (2) the memory observes an operation (e.g. a data cast-out of a modified cache line) that indicates a future cache miss on the address will not be serviced by a cache |

When the memory controller 122 receives a cache request, the memory-side prediction mechanism 400 checks its prediction table. If the address is found, the prediction mechanism 400 predicts that the cache request will be serviced by another cache, and therefore will not initiate the memory access immediately. If the address is not found, the memory-side prediction mechanism 400 predicts that the cache request should be serviced by the memory, and therefore will initiate the memory access immediately.

To improve the utilization of the prediction table, the prediction mechanism 400 should not record any private address. An address is private to a particular cache if the data cannot be cached in another cache. For example, when the memory controller 122 is to service a cache miss, if the corresponding cache snoop result shows that the requested data is not cached in any cache, the prediction mechanism 400 may not record the address in its prediction table. This is because the prediction mechanism 400 cannot determine at the time whether the requested cache line is private to a particular cache.

An enhancement of the above implementation is to use a prediction table similar to the one described in the third embodiment. Each entry in the prediction table has a super-block address and a V vector that contains a V bit for each cache line in the super-block. This may lead to a smaller prediction table with comparable prediction accuracy.

Figure 7:
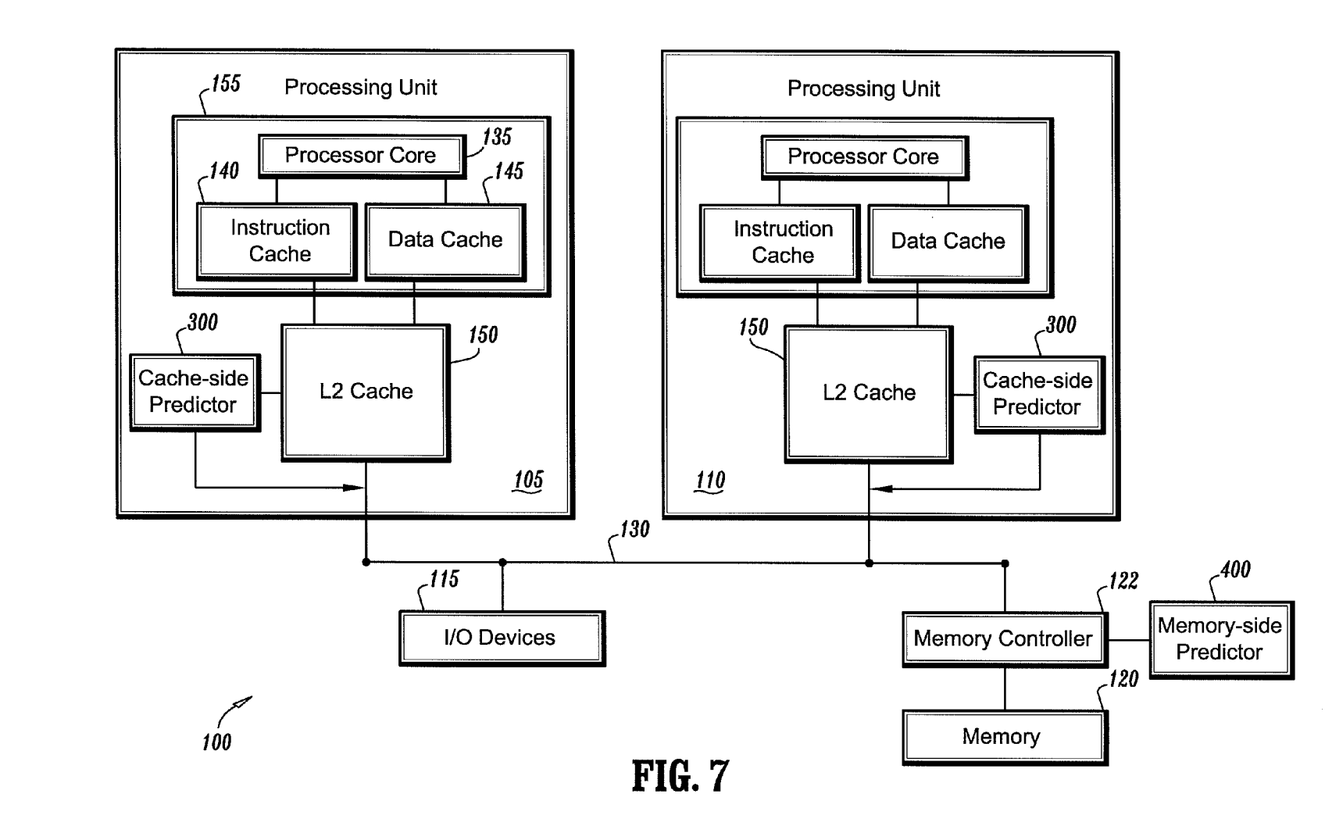
FIG. 7 shows a computer system with a cache-side cache residence prediction mechanism and a memory-side cache residence prediction mechanism, in accordance with one embodiment of the present invention.

In a sixth embodiment of the present invention, the system implements both the cache-side prediction mechanism 300 and the memory-side prediction mechanism 400, as illustrated in FIG. 7. An exemplary implementation uses the simple cache-side prediction mechanism described in the first embodiment, and the memory-side prediction mechanism described in the fifth embodiment.

When a memory controller receives a cache request, if the associated cache-side prediction result indicates that the data will be supplied by another cache, the memory is not accessed immediately. However, if the cache-side prediction result indicates that the data cannot be supplied by another cache, the memory-side prediction mechanism 400 need to produce its own prediction result. If the memory-side prediction result indicates that the data will be supplied by another cache, the memory is not accessed immediately. The memory controller 122 initiates the memory access immediately only when the prediction results from both the cache-side prediction mechanism and the memory-side prediction mechanism show that the data should be supplied by the memory.

The particular embodiments disclosed above are illustrative only, as the invention may be modified and practiced in different but equivalent manners apparent to those skilled in the art having the benefit of the teachings herein. Furthermore, no limitations are intended to the details of design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system of cache residence prediction in a computer system, comprising:
    a plurality of caches, comprising a first cache and one or more other caches; and
    a prediction mechanism predicting that data requested by the first cache of a cache miss can be found in at least one of the one or more other caches, if an address of the cache miss matches an address tag of a cache line in the first cache and the cache line in the first cache is in an invalid state, wherein the prediction mechanism further comprises a prediction table, wherein each entry in the prediction table corresponds to one or more cache lines determined by a hash function.

2. The system of claim 1, wherein the prediction table records one or more addresses of one or more recently replaced invalid cache lines.

3. The system of claim 1, wherein the prediction table records one or more addresses of one or more recently replaced shared cache lines.

4. The system of claim 1, wherein the prediction table records prediction information for one or more super-blocks, wherein each of the one or more super-blocks comprises one or more cache lines, and wherein each entry in the prediction table includes a super-block address and a valid vector that has a valid bit for each of the one or more cache lines.

5. A system of cache residence prediction in a computer system, comprising:
    a plurality of caches, comprising a first cache and one or more other caches;
    a memory and a memory controller operatively coupled to the memory; and
    a prediction mechanism operatively coupled to the first cache, the prediction mechanism predicting whether data requested by the first cache of a cache miss can be supplied by at least one of the one or more other caches, producing a prediction result, and sending the prediction result to the memory controller; wherein the memory controller uses the prediction result to determine if the memory is to be accessed immediately, or if the memory is not to be accessed until a corresponding cache snoop operation shows that the data requested by the first cache cannot be supplied by at least one of the one or more other caches, wherein the prediction mechanism further comprises a prediction table that records prediction information for one or more super-blocks, wherein each of the one or more super-blocks comprises one or more cache lines, and wherein each entry in the prediction table includes a super-block address and a valid vector that has a valid bit for each of the one or more cache lines.

6. The system of claim 5, wherein the prediction mechanism predicts that the data requested by the first cache of a cache miss can be supplied by at least one of the one or more other caches, if the address of the cache miss matches an address tag of a cache line and the cache line is in an invalid state.

7. The system of claim 5, wherein the prediction table records one or more addresses of one or more recently replaced invalid cache lines.

8. The system of claim 5, wherein the prediction table records one or more addresses of one or more recently replaced shared cache lines.

9. The system of claim 5, wherein each entry in the prediction table corresponds to one or more cache lines determined by a hash function.

10. The system of claim 5, wherein the memory can be a cache and the memory controller can be a cache controller of the cache.

11. A system of memory residence prediction in a computer system, comprising:
    a plurality of caches, comprising a first cache and one or more other caches;
    a memory and a memory controller operatively coupled to the memory; and
    a prediction mechanism predicting whether data requested by the first cache of a cache miss can be found in at least one of the one or more other caches, and producing a prediction result; wherein the prediction mechanism comprises a prediction table that is updated accordingly when the prediction mechanism observes a cache operation that can affect whether data requested by the first cache of a future cache miss can be found in at least one of the one or more other caches, wherein the prediction mechanism removes an address from the prediction table, if the memory controller observes a cache operation indicating that requested data by the first cache of a future cache miss on the address cannot be found in at least one of the one or more other caches.

12. The system of claim 11, wherein the prediction mechanism records an address in the prediction table, if the prediction mechanism observes a cache operation indicating that requested data by the first cache of a future cache miss on the address can be found in at least one of the one or more other caches.

13. The system of claim 11, wherein the memory controller uses the prediction result to determine if the memory is to be accessed immediately, or if the memory is not to be accessed until a corresponding cache snoop operation shows that the requested data cannot be supplied by at least one of the one or more other caches.

14. The system of claim 11, wherein the prediction table records prediction information for one or more super-blocks, wherein each of the one or more super-blocks contains one or more cache lines, and wherein each entry in the prediction table further comprises a valid vector that has a valid bit for each of the one or more cache lines.

15. The system of claim 11, wherein each table entry of the prediction table corresponds to one or more cache lines determined by a hash function.

16. The system of claim 11, wherein the memory can be a high-level cache and the memory controller can be a cache controller of the cache.

17. A system of memory residence prediction in a computer system, comprising:

a plurality of caches, comprising a first cache and one or more other caches;

a memory and a memory controller operatively coupled to the memory, a first prediction mechanism operatively coupled to the first cache, the first prediction mechanism predicting whether data requested by the first cache of a cache miss can be supplied by at least one of the one or more other caches, producing a first prediction result, and sending the first prediction result to the memory controller; and a second prediction mechanism operatively coupled to the memory, the second prediction mechanism predicting whether requested data by the first cache of a cache miss can be supplied by at least one of the one or more other caches, and producing a second prediction result;

wherein an overall prediction result is determined by the first prediction result and the second prediction result; and wherein the memory controller uses the overall prediction result to determine if the memory is to be accessed immediately, or if the memory is not to be accessed until a corresponding cache snoop operation shows that the data requested by the first cache cannot be supplied by at least one of the one of more other caches.

18. The system of claim 17, wherein the overall prediction result comprises predicting that data requested by the first cache can be supplied by at least one of the one or more caches, if the first prediction result or the second prediction result predicts that the data requested by the first cache can be supplied by at least one of the one or more caches.

19. The system of claim 17, wherein the memory can be a high-level cache and the memory controller can be a cache controller of the cache.

* * * * *